United States Patent [19]
Natarajan

[11] Patent Number: 5,654,958
[45] Date of Patent: Aug. 5, 1997

[54] SYSTEM AND METHOD FOR LEARNING AND DYNAMIC ROUTING OF DATA IN A MOBILE COMMUNICATION NETWORK

[75] Inventor: Kadathur S. Natarajan, Mesa, Ariz.

[73] Assignee: Motorola, Inc., Schaumburg, Ill.

[21] Appl. No.: 463,816

[22] Filed: Jun. 5, 1995

[51] Int. Cl.⁶ .................................................. H04B 7/26
[52] U.S. Cl. .............................. 370/410; 455/445
[58] Field of Search .................... 370/94.1, 94.2, 370/94.3, 60, 60.1, 16, 16.1, 85.13, 85.14, 95, 1, 95.3; 340/827, 826

[56] References Cited

U.S. PATENT DOCUMENTS

| | | | |
|---|---|---|---|
| 4,788,721 | 11/1988 | Krishnan et al. | 340/827 |
| 4,825,206 | 4/1989 | Brice, Jr. et al. | 340/827 |
| 5,095,480 | 3/1992 | Fenner | 370/94.1 |
| 5,128,926 | 7/1992 | Perlman et al. | 340/827 |
| 5,412,654 | 5/1995 | Perkins | 370/94.1 |

Primary Examiner—Wellington Chin
Assistant Examiner—Soon Dong Hyun
Attorney, Agent, or Firm—Harold C. McGurk, IV

[57] ABSTRACT

A communications system (20) and method (100) learns and dynamically selects routes among a number of nodes (1–12) based on network state information. Each of the nodes (1–12) monitors its links and determines the state of each of its link. Each of the nodes (1–11) transmits their respective link state information to a designated node called a center node (12) by using forward propagation. After the link state information has been received from all of the nodes (1–11), the center node (12) aggregates them and forms a comprehensive state of the entire network. This network state information is subsequently distributed by the center node (12) to each of the nodes (1–11) in the network using reverse propagation. Each of the node (1–11) uses the network state information in making route selection decisions for connection requests that arrive after the node updates its network state information. The process of learning about network state information is or will be repeated after a predetermined amount of time (or at periodic intervals).

18 Claims, 4 Drawing Sheets

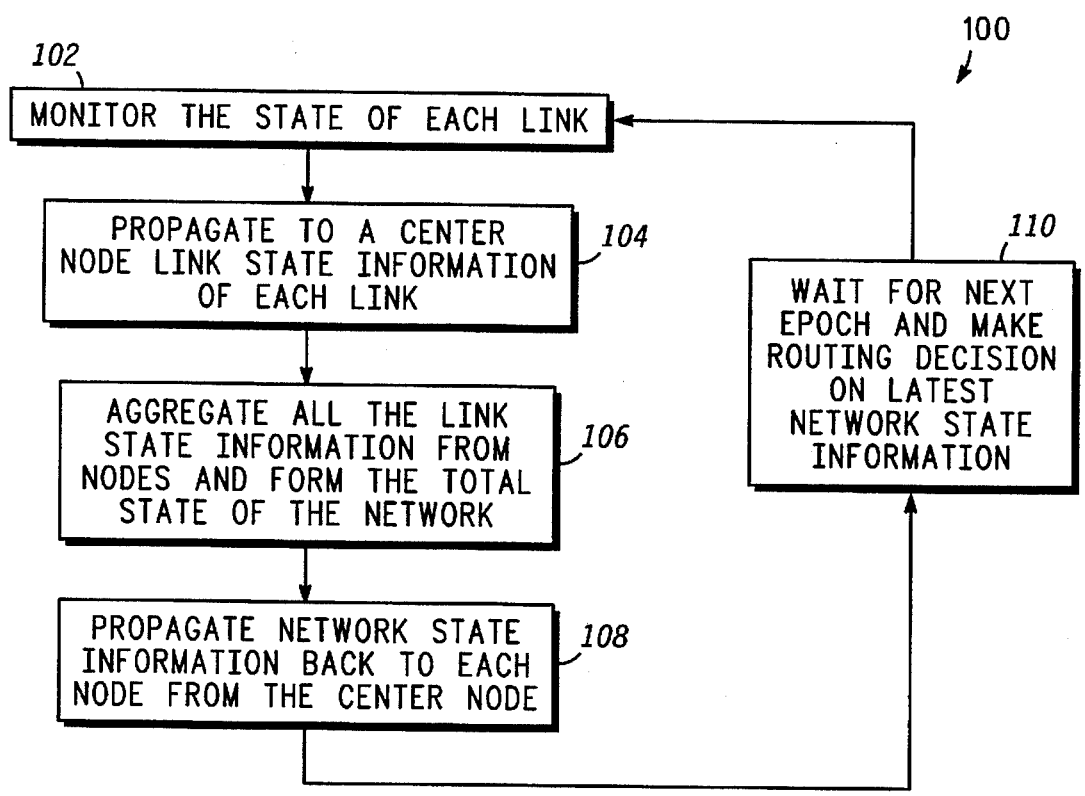

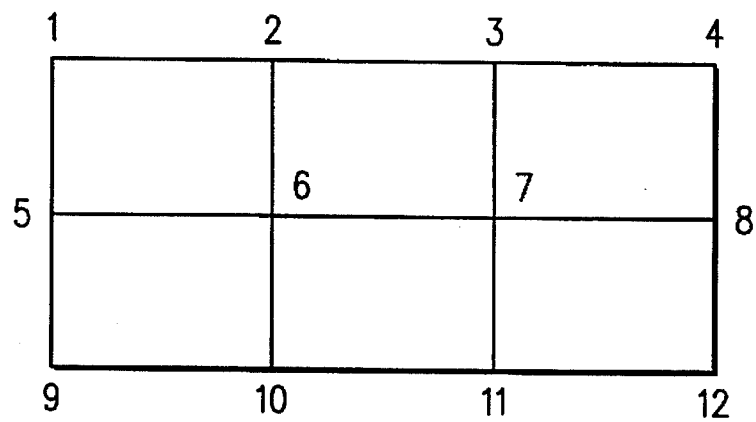
FIG. 5
FIG. 6
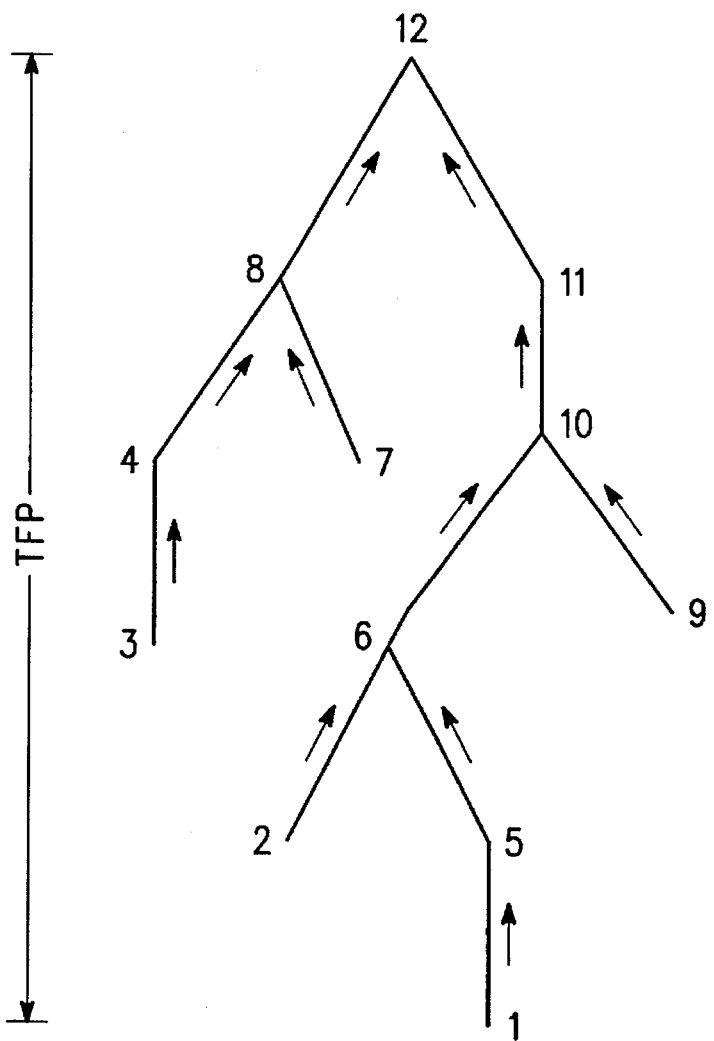

SYSTEM AND METHOD FOR LEARNING AND DYNAMIC ROUTING OF DATA IN A MOBILE COMMUNICATION NETWORK

FIELD OF THE INVENTION

The present invention relates generally to communication methods and, more particularly, to a system and method for propagating network state information to each node in a network for dynamic routing decision-making.

BACKGROUND OF THE INVENTION

A communication network may include any number of nodes interconnected by communication links. The networks may deliver electronic communications between two points by routing the communications over the links from one node to another node within the network. As the number of nodes in a network increases and as the number of communication paths available to each network node increases, the number of potential paths available for delivering any single communication likewise increases.

Routing is a key function for efficient and cost-effective operation and management of mobile cellular communication systems. Telecommunication networks, including terrestrial and satellite cellular systems, may share the following key characteristics (1) a dynamically changing network topology; (2) dynamically varying link capacities; and (3) time-varying traffic flow requirements.

For a given nodal communication infrastructure, the first two factors (network topology and link capacity) are predictable as a function of time. The third factor, the traffic offered to the network, is typically either based on marketing projections or on historical usage information. Whatever method is used, the time-varying traffic that must be carried between various pairs of nodes in the network is not accurately predictable. The problem of predicting traffic flow requirements is further complicated by unexpected events that cause temporary deviations in traffic demands. Such events will cause focused overload of traffic at unpredictable user locations in the system.

Networks often use techniques for specifying a route to follow when delivering a communication from a source node to a destination node. These techniques can be sophisticated and are often carried out by computer analysis based upon models of the entire network. The complexity of the route specification problem and the amount of intelligence and processing power required to solve the route specification problem can force at least a portion of the route determination problem to be solved "off-line" before the communications are actually delivered through the network nodes.

Selecting routes before communication delivery makes the network vulnerable to link failures. For example, when an off-line process evaluates the route determination problem, a particular link may be operational. Thus, the off-line process specifies the use of the particular link in various routes from various source nodes to various destination nodes. If this particular link then fails, all communications being delivered according to the off-line process specifications over the failed link fail to reach their intended destinations.

These conventional methods based on static routing techniques are suited for lightly utilized networks. For moderately or heavily utilized networks, the success of static routing depends on the accuracy of traffic forecasting methods used to define the routes. Moreover, these methods are sensitive to variations in traffic offered to the system. Accordingly, there is a significant need for a system and method which do not route communications based on static or preplanned routing techniques.

BRIEF DESCRIPTION OF THE DRAWINGS

FIG. 3 shows an example of an array for storing network state information at each node according to a preferred embodiment of the present invention;

FIG. 4 shows a flowchart of a method for monitoring and propagating network state information among nodes according to a preferred embodiment of the present invention;

FIG. 5 shows an example of a nodal communication system;

FIG. 6 shows an example of forward propagation of link state information to a center node;

DESCRIPTION OF THE PREFERRED EMBODIMENTS

Figure 1:
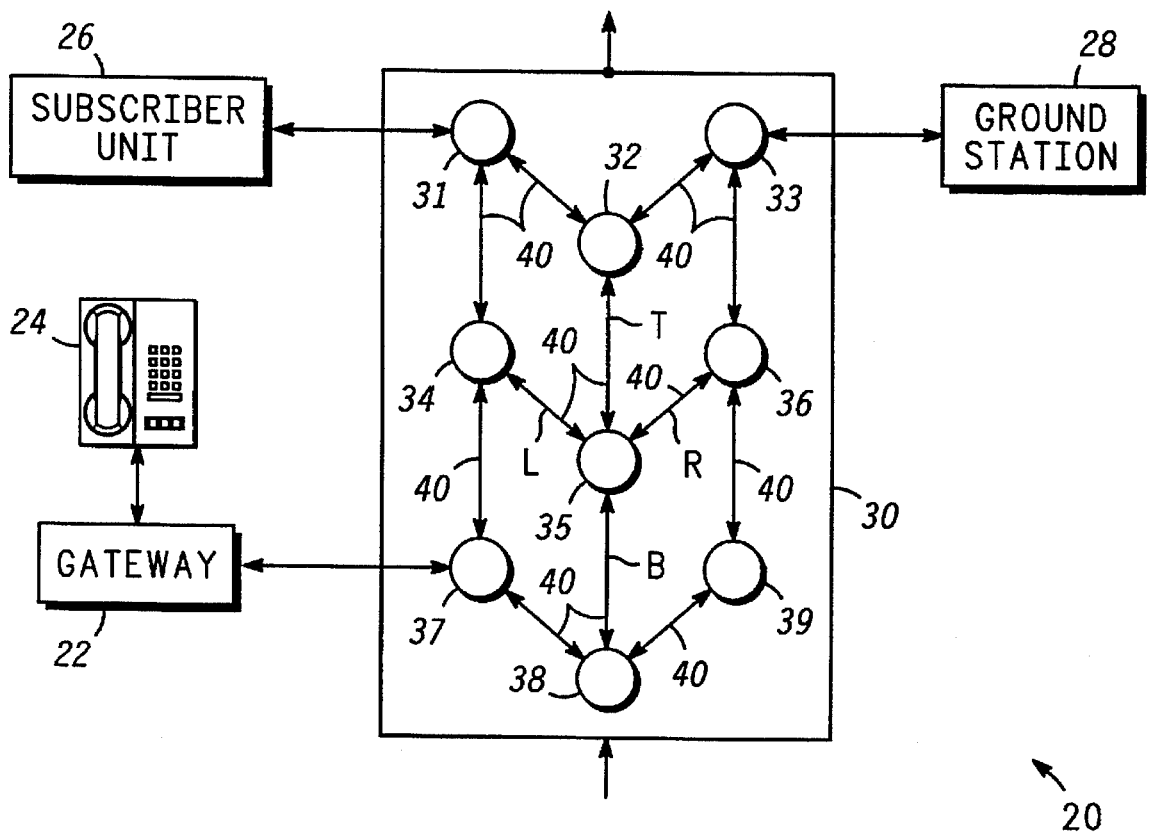
FIG. 1 shows a block diagram of a communications network.

FIG. 1 shows a block diagram of nodal communications network 20. In the preferred embodiment, network 20 comprises any number of intercoupled nodes, including gateways 22, telephonic devices 24, subscriber units 26, ground station node 28 and a constellation of switching nodes 30. There may be any number of gateways 22, each of which couples to any number of telephonic devices 24, such as conventional telephone instruments, facsimile machines, modems, and the like, for example. Likewise, network 20 includes any number of subscriber units 26 (e.g., cellular phones and pagers) and at least one ground station node 28. Gateway 22, subscriber units 26 and ground station node 28 use radio frequency (RF) communications to communicate with one another through a constellation 30 of switching nodes. How gateways 22, subscriber units 26, ground station nodes 28 and constellation 30 physically communicate with one another is well known to those of ordinary skill in the art.

In the preferred embodiment, the vast majority of subscriber units 26 are intended to be mobile units which may freely move anywhere on or near the surface of the earth and which may support one call at a time. Gateways 22 and ground station nodes 28 are also located on or near the surface of the earth, but they may simultaneously support a multiplicity of independent calls. Nothing prevents ground station node 28 from also serving as gateway 22, and vice-versa.

Constellation 30 is formed from any number of switching nodes, which are generally or collectively referred to as switching nodes. In the preferred embodiment, constellation 30 comprises sixty-six switching nodes (e.g., satellites) distributed in low-earth, polar orbits to provide RF coverage over substantially the entire surface of the earth. However, for the sake of clarity, FIG. 1 illustrates an example of constellation 30 which includes only nine switching nodes, individually referred to by the numbers 31–39. The number of switching nodes may be greater or less than sixty-six switching nodes and the switching nodes may orbit earth in low-earth, medium-earth, geosynchronous, polar, inclined-angle orbit or any combination thereof.

In the preferred embodiment, switching nodes move in a low-earth orbit about earth at speeds of around 25,000 km/hr, while moving relative to each other as their orbits converge when approaching the north and south poles and diverge as they approach the equator. Gateways 22, subscriber units 26, and ground station nodes 28, which may reside anywhere on the earth, communicate directly with a switching node that is overhead at the moment the communications take place. However, due to the speed at which the switching nodes are moving, the switching node which supports a given earth-bound link may change from moment to moment.

In the preferred embodiment, gateways 22, ground station nodes 28 and switching nodes are controlled by computers. In other words, each includes processors, controllers, or other programmable devices which cause the nodes to operate according to computer software which is stored in a memory located in the node. The switching nodes and gateways 22 include switching fabrics which are likewise computer-controlled. The switching fabrics cause communications which enter the nodes on any of a variety of links to then leave the nodes over a variety of links. In the preferred embodiment, each switching node has a switching capacity which matches the capacity of all links terminated at the node. In other words, when all links terminated at a switching node carry their maximum amount of communication traffic, the switching node can successfully switch the communication traffic as needed to allow the communication traffic to be delivered through network 20.

In particular, the switching nodes communicate with one another through communication links 40. Desirably, each switching node terminates two or more links 40. For clarity, FIG. 1 illustrates links 40 as terminating only at some neighbor nodes, with no links wrapping around between top and bottom and left and right sides of constellation 30. However, this is not a requirement of the present invention. Generally, switching node 35 terminates four links 40, which couple to neighbor switching nodes in top (T), bottom (B), left (L), and right (R) directions relative to switching node 35.

In network 20, a communication may originate at any location on or near the surface of the earth. The communication originates from or is routed through gateway 22, subscriber unit 26, or ground station node 28 to constellation 30. One of switching nodes 31–39 which receives this up-link communication is considered a source node. Network 20 routes the communication through switching nodes 31–39 in a manner which is described below. The destination node is one of the switching nodes 31–39 where the communication is down-linked to the surface of the earth to either gateway 22, subscriber unit 26 or ground station node 28. All switching nodes that receive the communication from another switching node and transmit the communication to another switching node are considered intermediate nodes.

As an example, FIG. 1 illustrates a scenario where a communication destined for subscriber unit 26 may originate at telephonic instrument 24, and then passes through gateway 22, where it is up-linked to switching node 37. Switching node 37 is the source node, and switching node 31 is the destination node. Network 20 has many options in selecting links 40 for use in routing the communication between source node 37 and destination node 31. However, the route passing from node 37, to node 34, and to node 31 is desirable because it is a shortest path route. In other words, any other route will use a greater number of links 40 to deliver the communication between source and destination nodes 37 and 31. By using node 34 to route the communication between source and destination node 37 and 31, node 34 is considered an intermediate node for this communication.

Shortest path routes are desirable because they minimize the delay involved in delivering a communication. In addition, they are desirable because they cause network 20 to expend fewer of its finite, limited resources in delivering any single communication and allows a greater number of resources to remain available for delivering other communications. Further, shortest path routes are more reliable because a failure of link 40 in constellation 30 is less likely to affect a route which includes fewer links.

Figure 2:
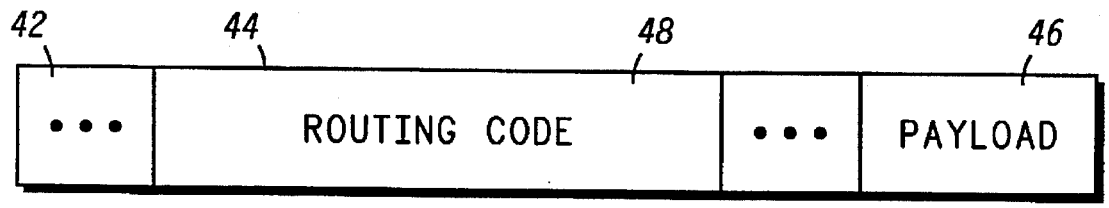
FIG. 2 shows a data format diagram of a digitized data packet according to a preferred embodiment of the present invention.

FIG. 2 shows a data format diagram of a digitized data packet 42 delivered by network 20 (see FIG. 1) according to a preferred embodiment of the present invention. Packet 42 includes header portion 44 and payload portion 46. Payload portion 46 conveys the information for delivery across network 20. Header portion 44 conveys overhead data which network 20 uses to manage the delivery of payload portion 46. Overhead data include routing code 48, which a source switching node appends to the payload data. The routing code defines the route which the packet 42 will take from its source switching node, through intermediate switching nodes if any, to its destination switching node.

FIG. 3 shows an example of array 50 for storing network state information at each node according to a preferred embodiment of the present invention. Array 50 shown in FIG. 3 is based on nodal network 30 shown in FIG. 1. As shown in FIG. 3, there are three columns (52, 54 and 56). The first column 52 stores a node number which represents "from" where a link starts. The second column 54 stores another node number which represents "to" where a link ends. Corresponding to each row in array 50, a link exists from the node shown in the first column to the node given in the second column. The third column 56 stores link state information about the link (as given in the first two columns). Data structures other than array 50 may be used for storing link state information.

FIG. 4 shows a flowchart of method 100 for monitoring and propagating network state information among nodes according to a preferred embodiment of the present invention. Method 100 is performed by processing, controlling, or like devices which operate in response to software programming instructions stored in memory of switching nodes. Nothing prevents method 100 from performing numerous steps which are not related to the present invention. An overview of the flowchart will be provided first followed by a detailed discussion of each of the steps.

At a periodic interval, each node in a network monitors in step 102 its links and determines the state of each link which connects to a neighbor node. Each of the nodes transmits in step 104 their respective link state information to a designated node called a center node. This process is referred to as forward propagation and takes a certain amount of time. After the link state information has been received from all of the nodes, the center node aggregates all of the link state information in step 106 and forms a comprehensive state of the entire network, referred to as network state information. The network state information is subsequently distributed by the center node in step 108 to each node in the network using reverse propagation that takes a certain amount of time. The total amount of time for each node to gain comprehensive knowledge of the state of the network is the total time spent in forward propagation, aggregation and reverse propagation. Thus, each node gains knowledge of the most, up-to-date state of the entire network and can use this knowledge in making dynamic route selection decisions for connection requests that arrive after the node updates its network state information. The process of learning about the network state information is repeated after a predetermined amount of time (or at periodic intervals).

As shown in FIG. 4, method 100 begins at step 102 by monitoring the state or local conditions of each link 40. A "link" is what connects one node to another node. Link state information is generated and monitored in step 102 by each node for each link. For example, there is link state information generated for each link as it pertains from one node to another node. For example, node 31 as shown in FIG. 1 generates and monitors link state information for link (31->34) and link (31->32). Similarly, node 35 generates and monitors link state information for link (35->32), link (35->34), link (35->36) and link (35->38). Node 31, however, does not generate and monitor link state information for link (34->31). Node 34 will monitor the link state information for link (34->31).

Link state information comprises information about the link, including for example, current load on a link, call capacity and routing information. The current load on a link may include information about the number of calls the link is handling, or it may include how many data packets the link is currently handling. Call capacity may specify, for example, the maximum number of calls the link can handle. Routing information may include performance characteristics, including for example, current flow and queue sizes and delays.

According to FIG. 4, once each node generates and monitors the link state information for each of its links, each node propagates in step 104 the link state information to a designated node called the center node. One of the ways in which the center node is chosen is based on such factors as the node having the lowest caller load of all the nodes in the system. Those of ordinary skill in the art may devise other ways for determining which node is going to be the center node. Propagating link state information to a center node is known as forward propagation. Forward propagation is performed by performing a hop-by-hop propagation of the link state information toward the center node. A ground control station, such as gateway 22 for example, determines and preprograms each of the nodes with what node is going to be the center node, to where a node will pass its link state information during specific time frames and to where a node will pass the network state information during reverse propagation. Each of the nodes may store an array which contains N number of time epochs, where an element I, corresponding to time epoch I, specifies the node to which the link state information must be forward propagated to reach the center node. Other data structures may be used as known to those of ordinary skill in the art. The general rule for forward and reverse propagation is to minimize the number of hops such that the node farthest from the center has as small of a distance as possible.

An example of how forward propagation works is shown in FIGS. 5 and 6. FIG. 5 shows a network or a nodal communication system where each number represents a node. Each node is connected to an adjacent node by a link. Link state information is generated by each node for the link originating at the particular node.

FIG. 6 shows an example of forward propagation of link state information to a center node based on the nodal communication system 10 shown in FIG. 5. In FIG. 6, node 12 is designated the center node. As shown in FIG. 6, each node propagates its link state information toward the center node. As shown, link state information of node 1 is forwarded or sent to node 5. As mentioned previously, link state information of node 1 includes information about link (1->2) and link (1->5). Node 5 then propagates received link state information with its own link state information to node 6. This includes previously sent link state information of node 1 (i.e., link (1->2) and link (1->5)) and its own link state information (i.e., link (5->1), link (5->6) and link (5->9)). If node 5 does not receive any link state information from another node during a predetermined period of time, node 5 may decide to forward old link state information previously sent, or node 5 may decide not to send any old link state information which is older than a predetermined amount of time.

Once node 6 receives the link state information from nodes 2 and 5, node 6 forward propagates its own and the received link state information to node 10. Node 10 in turn sends its own and any link state information received from nodes 1, 2, 5, 6 and 9 to node 11 which then forwards it to center node 12.

As shown in FIG. 6, link state information of node 3 is propagated to node 4, which in turn propagates the received link state information with its own to node 8. Node 8 sends its own link state information and information received from nodes 3, 4 and 7 to center node 12. Center node 12 thus receives all link state information from all the other nodes 1–11. Although forward propagation as described above included sending the node's own link state information with information received from other nodes, other variations of forward propagation are possible. For example, an alternate implementation of forward propagation may work as follows. A node may send its own link state information toward the center node before sending any link state information received from other nodes. For example, node 8 may send its link state information to node 12 in one time period, before it sends the link state information received from nodes 4 and 7 in a subsequent time period.

In a mobile satellite cellular system, the topology shown in FIG. 1 or FIG. 5 could be changing as a function of time. Thus, linkage information (which node is connected to what node) may be precomputed and stored ahead of time at each node or computed on-board the satellite. The procedure used for determining node linkage is outside the scope of this invention.

Returning to FIG. 4, once the center node receives the link state information from the other nodes during the forward propagation in step 104, the center node (12 in FIGS. 5 and 6) aggregates all the link state information from the nodes and forms a comprehensive state of the network, referred to as network state information. Network state information provides information about state of the network, including for example, which links are close to capacity, which links are not being used and which links may be down. Such aggregated link state information about each of the links in the network is important for deciding the best route for passing information between a source node and a destination node. In other words, the nodes use the network state information in dynamic route selection.

Figure 7:
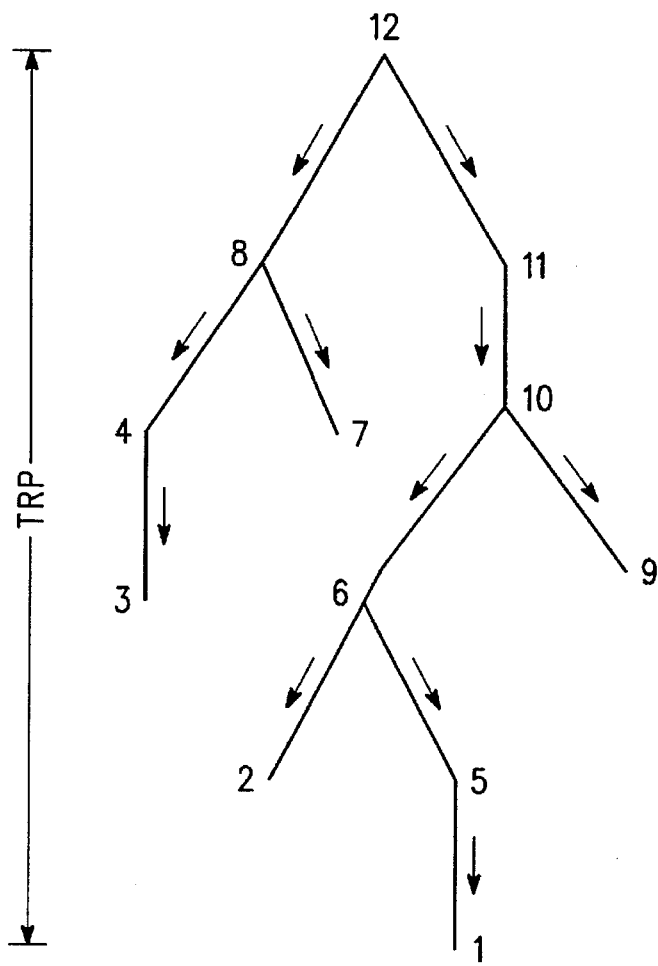
FIG. 7 shows an example of reverse propagation of network state information from a center node to a number of other nodes.

Once the center node aggregates in step 106 all of the link state information of each of the nodes, the center node reverse propagates in step 108 the network state information back to each node. An example of reverse propagation is shown in FIG. 7. To distribute the network state information, center node 12 forwards the network state information to nodes 8 and 11. Node 8 distributes the network state information to nodes 4 and 7, while node 11 concurrently distributes the network state information to node 10. Next, node 4 distributes the information to node 3, and node 10 simultaneously distributes the network state information to nodes 6 and 9. Node 6 then propagates the network state information to nodes 2 and 5. Finally, node 5 distributes the network state information to node 1, the last node to receive the information. The order by which the nodes receive the information is not as important so long as the network state information is distributed efficiently and quickly to each of the nodes in the network.

Once the center node reverse propagates the network state information to all the other nodes in the network in step 108 of FIG. 4, method 100 waits for the next time epoch before repeating the steps of method 100. Method 100 is cyclic or repeats after a predetermined amount of time. While method 100 is waiting in step 110, the nodes in the network are making routing decisions based on the aggregated network state information reverse propagated from the center node.

Whenever a connection request (a circuit-switched path or a packet-switched virtual path) arrives at a node, the node uses the latest network state information and identifies the best path to use at that time. Each node updates the link busy statistics and sets up the connection. When a connection terminates, the resources are released and the link busy statistics are updated.

A key problem in the design, operation, control and management of a telecommunication network is how to route efficiently traffic between various source and destination node pairs in a network. A network is created by incurring a certain cost for the nodal infrastructure (i.e., costs of switches and communication links that interconnect them). Routing determines how efficiently a given network is used to transport offered traffic subject to meeting a set of end-user performance requirements.

A telecommunication network could be a circuit-switched network, a packet-switched network or an integrated, hybrid switching network. Performance is measured in terms of end-to-end (source to destination) blocking probability (CS) or end-to-end delay (PS), depending on the switching technique used.

Consider the telecommunication network shown in FIG. 5. Suppose there is a need to transport traffic (e.g., calls or data packets) from source node 1 to destination node 12. The set of possible routes available from node 1 to node 12 is quite large. From the point of minimizing traffic delay (PS network) or blocking probability (CS network), a desirable objective of traffic routing is to use routes with small path lengths. An example of such a path is the node sequence 1->6->7->11->12. During actual operation of the telecommunication network, connection requests (i.e., requests for setting up routes) arrives according to some predetermined process.

In a CS network, the request can be expressed as (source node, destination node, amount of bandwidth needed). In a PS network, the request for a virtual-circuit connection can be expressed as (source node, destination node, upper limit on average delay from source to destination). Generalizations of the above types of requests are possible.

It is the objective of dynamic routing to satisfy requests for service if the network has the resources available. In the example network shown in FIG. 5, let link(1,2) denote the communication link connecting nodes 1 and 2. At any time instant, there is an attribute associated with the link, denoted as capacity(1,2). The attribute defines the maximum amount of traffic that link(1,2) can carry at that time instant. In a CS network, it is the number of voice channels (requiring dedicated fixed bandwidth) that can be carried by the link. In a PS network, it is the number of packets per unit time (in a store-and-forward manner) that can be carried on the link.

In general, the traffic flowing on link(1,2) will be determined by the set of all routes that contain the link and the amount of traffic carried on each route. The link may be contained in one or more routes between a node pair and in the set of routes allowed between one or more distinct node pairs. The dynamic routing procedures must ensure that a communication link carries no more traffic than a specified upper limit.

The upper limit may be defined differently in a circuit-switched network than in a packet-switched network. In a circuit-switched network, traffic flow could be limited to an upper limit (e.g., upper limit=80% of capacity). This upper limit is a specified percentage of its physical limit, capacity (1,2). Equivalently, the blocking probability on the link should not exceed a specified upper limit. In a packet-switched network, the utilization of a link should not exceed an upper limit or equivalently, the average delay on the link (queuing time plus transmission time) should not exceed a specified upper limit.

Consider a node S in a network. As a given time T, node S has a set of neighbors and maintains state information about each link from S to its neighbors. For link(S,1), connecting node S to neighboring node 1, busy(S,1) is the actual bandwidth in use at time T in a circuit-switched network, while delay(S,1) is the average delay in using the link in a packet-switched network.

Figure 8:
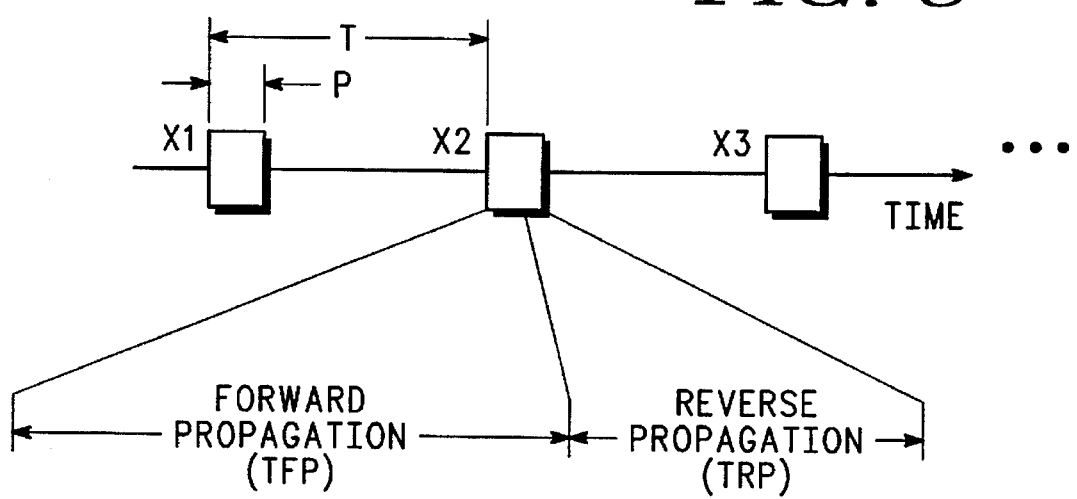
FIG. 8 shows when forward and reverse propagations occur in time according to a preferred embodiment of the present invention.

FIG. 8 shows when forward and reverse propagations occur according to a preferred embodiment of the present invention. As shown in FIG. 8, a sequence of time epochs (X1, X2, ... Xn) exist on the time axis. At each time epoch Xi, each node in the network determines the state of each link connecting itself to its neighbor nodes. The determination or monitoring results in link state information for each node.

Time interval "T" represents the time interval between successive updates of the network state information. The nodes propagate their observations and collectively update their views of the network state every T seconds (e.g., T equals one second). "P" represents the amount of time spent per T seconds during which the state information is propagated throughout the network. P may be equal to 10 msecs, for example. As shown in FIG. 8, within the P time period, forward propagation and reverse propagation are occurring. The amount of time required for forward propagation is known as "TFP", while the amount of time needed for performing reverse propagation is represented as "TRP". Thus, it takes TFP time for each node to propagate its link state information toward the center node. It takes TRP time for the center node to propagate the network state information to each node in the network.

The method described herein enables a communication system to be more robust or less sensitive to accuracy of static traffic projections, and is better utilized (i.e., achieves a greater traffic handling capability) than systems based on static routing methods. For moderate to heavily utilized networks, the new propagation and routing method is likely to outperform static routing methods and offer at least the following advantages. It is an advantage of the present invention to provide better reliability in case of unexpected link or node failures. It is another advantage that no prior knowledge regarding offered traffic is required. Yet other advantages are improved robustness (i.e., less sensitive to localized congestion), improved utilization of system resources and improved quality of service experienced by the users.

By incorporating the logic of route computation at the satellites and using up-to-date link or network state information, the resources of the network are significantly better utilized compared to a static routing method. Other benefits over a static routing method approach are the elimination of large storage requirement at the nodes (satellites) for storing precomputed routes, elimination of communication overhead to upload the precomputed routes, and dynamic response to changes in traffic load conditions as well as link and/or satellite failures. These dynamic routing methods can be implemented by incurring little communication overhead for the purpose of propagating network state information to each of the nodes.

The present invention has been described above with reference to a preferred embodiment. However, those skilled in the art will recognize that changes and modifications may be made in these preferred embodiment without departing from the scope of the present invention. For example, those of ordinary skill in the art may arrange processes, steps, and procedures differently than described herein while achieving equivalent results. These and other changes and modifications which are obvious to those skilled in the art are intended to be included within the scope of the present invention.

What is claimed is:

1. A method for propagating network state information to a plurality of nodes, the method comprising the steps of:
    a) gathering link state information at periodic intervals of time from each of the nodes;
    b) a center node aggregating the link state information to create network state information;
    c) the center node distributing the network state information to each of the nodes; and
    d) communicating data between the nodes by selecting routes based on the network state information.

2. A method as recited in claim 1, wherein step (a) includes the steps of:
    a1) monitoring a number of calls each link of each of the nodes is handling;
    a2) monitoring a call capacity of each link of each of the nodes; and
    a3) using the number of calls and the call capacity as the link state information for each of the nodes.

3. A method as recited in claim 1, wherein step (a) includes the step of forward propagating the link state information from each of the nodes to a center node.

4. A method as recited in claim 3, wherein step (a) further includes the step of each of the nodes transmitting the link state information to at least one adjacent node until the link state information of each of the nodes is received by the center node.

5. A method as recited in claim 1, wherein step (b) includes the step of aggregating link call capacities of each link of each of the nodes into the network state information.

6. A method as recited in claim 1, wherein step (b) includes the step of forming the network state information from the link state information of each of the nodes.

7. A method as recited in claim 1, wherein step (c) includes the step of reverse propagating the network state information from a center node to each of the nodes.

8. A method as recited in claim 7, wherein step (c) further includes the step of the center node transmitting the network state information to at least one adjacent node until the network state information is received by each of the nodes.

9. A method as recited in claim 1, wherein step (d) includes the step of communicating the data between the nodes based on routes selected that comprise less-utilized links as determined from the network state information.

10. A method as recited in claim 1, further comprising the step of repeating steps (a)–(d) at a periodic interval.

11. A method for propagating network state information to a plurality of nodes, the method comprising the steps of:
    a) forward propagating link state information about each link of each of the nodes from the nodes to a center node;
    b) aggregating the link state information to create network state information;
    c) reverse propagating the network state information from the center node to each of the nodes; and
    d) communicating data between the nodes by selecting routes based on the network state information.

12. A method as recited in claim 11, further comprising the steps of:
    e) monitoring a number of calls each link of each of the nodes is handling;
    f) monitoring a call capacity of each link of each of the nodes; and
    g) using the number of calls and the call capacity as the link state information for each of the nodes.

13. A method as recited in claim 11, wherein step (a) further includes the step of each of the nodes transmitting the link state information to at least one adjacent node until the link state information of each of the nodes is received by the center node.

14. A method as recited in claim 11, wherein step (b) includes the step of aggregating link call capacities of each link of each of the nodes into the network state information.

15. A method as recited in claim 11, wherein step (b) includes the step of forming the network state information from the link state information of each link of each of the nodes.

16. A method as recited in claim 15, wherein step (c) further includes the step of the center node transmitting the network state information to at least one adjacent node until the network state information is received by each of the nodes.

17. A method as recited in claim 1, further comprising the step of repeating steps (a)–(d) at a periodic interval.

18. A nodal communication system comprising:

a plurality of nodes, each of the nodes including means for forward propagating link state information about each link of each of the nodes and means for reverse propagating network state information to each of the nodes; and a center node coupled to some of the nodes, the center node receiving the link state information and aggregating the link state information to create the network state information.

* * * * *